United States Patent
Rizzo

(10) Patent No.: US 8,305,783 B2
(45) Date of Patent: Nov. 6, 2012

(54) SYSTEMS AND METHODS FOR POLYPHASE ALTERNATING CURRENT TRANSFORMER INRUSH CURRENT LIMITING

(75) Inventor: Richard Rizzo, Burbank, CA (US)

(73) Assignee: B/E Aerospace, Inc., Wellington, FL (US)

( * ) Notice: Subject to any disclaimer, the term of this patent is extended or adjusted under 35 U.S.C. 154(b) by 594 days.

(21) Appl. No.: 12/556,731

(22) Filed: Sep. 10, 2009

(65) Prior Publication Data

US 2011/0058397 A1  Mar. 10, 2011

(51) Int. Cl.
H02H 7/125 (2006.01)

(52) U.S. Cl. .......................................... 363/53
(58) Field of Classification Search .......... 363/50, 363/52, 53; 361/56, 86, 93.9, 118
See application file for complete search history.

(56) References Cited

U.S. PATENT DOCUMENTS

| | | | |
|---|---|---|---|
| 3,346,799 A * | 10/1967 | Aldenhoff | 363/70 |
| 4,207,516 A * | 6/1980 | Babcock | 363/49 |
| 4,891,764 A * | 1/1990 | McIntosh | 318/432 |
| 5,187,653 A | 2/1993 | Lorenz | |
| 5,619,127 A | 4/1997 | Warizaya | |
| 5,627,738 A * | 5/1997 | Lubomirsky et al. | 363/49 |
| 5,737,196 A * | 4/1998 | Hughes et al. | 363/8 |
| 5,920,186 A | 7/1999 | Ninh et al. | |
| 5,930,130 A | 7/1999 | Katyl et al. | |
| 5,995,392 A | 11/1999 | Turner | |
| 6,163,469 A | 12/2000 | Yuki | |
| 6,222,169 B1 | 4/2001 | Han et al. | |
| 6,538,864 B2 | 3/2003 | Mullner | |
| 6,646,842 B2 | 11/2003 | Pan et al. | |
| 7,379,311 B2 | 5/2008 | Shih | |
| 2002/0191359 A1 | 12/2002 | Chen | |
| 2003/0128557 A1 | 7/2003 | Coffey et al. | |
| 2005/0036248 A1 * | 2/2005 | Klikic et al. | 361/42 |
| 2005/0060587 A1 * | 3/2005 | Hwang et al. | 713/300 |
| 2006/0274468 A1 | 12/2006 | Phadke | |
| 2007/0053215 A1 | 3/2007 | Wang et al. | |
| 2007/0228837 A1 * | 10/2007 | Nielsen et al. | 307/82 |
| 2008/0115512 A1 | 5/2008 | Rizzo | |
| 2008/0247105 A1 * | 10/2008 | Divan | 361/56 |
| 2008/0253154 A1 * | 10/2008 | Schiene et al. | 363/50 |

* cited by examiner

*Primary Examiner* — Jue Zhang
(74) *Attorney, Agent, or Firm* — Drinker Biddle & Reath LLP

(57) ABSTRACT

An inrush current protection circuit for a polyphase alternating current power system may include a plurality of current limiting resistors, each of which is electrically coupled in series between a respective one of a plurality of phases of the polyphase alternating current power source and a respective input of a polyphase transformer rectifier unit. The circuit may also include a plurality of power switches, each of which is electrically coupled in parallel with a respective one of the current limiting resistors, such that when each of the power switches is closed, essentially no electrical current flows through the respective current limiting resistor. The circuit may also include a power switch controller configured to control each of the power switches to be open such that an inrush current passes through the respective current limiting resistor rather than the power switch, and to be closed after a time delay has passed.

21 Claims, 7 Drawing Sheets

SYSTEMS AND METHODS FOR POLYPHASE ALTERNATING CURRENT TRANSFORMER INRUSH CURRENT LIMITING

BACKGROUND

1. Field of the Invention

The present invention generally relates to electrical transformer inrush current limiting, and more particularly to systems and methods for polyphase alternating current transformer inrush current limiting.

2. Related Art

Aircraft typically provide three phase wild frequency alternating current (AC) power generation capability for use by electrical systems onboard the aircraft. An electrical system typically includes a power transformer which converts the wild frequency three phase AC power provided by the aircraft into either direct current (DC) electrical power, constant frequency AC electrical power, or wild frequency AC electrical power having a different voltage. For example, the power transformer may convert the wild frequency AC power into DC constant voltage power which is then supplied to one or more electrical components via a DC bus. The power transformer may provide a substantial amount of electrical current, for example more than 1, 2, 5, 10, 20, 50, or 100 amps of current, to the one or more electrical components onboard the aircraft.

When an electrical component which is electrically coupled with the power transformer to receive electrical current therefrom is first powered on, an "inrush" of current typically flows into the power transformer due to a large capacitance of the electrical component and/or power bus to which the power transformer is coupled. This inrush current may exceed power quality requirements of the aircraft electrical power system.

An aircraft electrical power system typically has momentary power interruptions which vary from approximately 20 to 200 milliseconds (ms) in duration. Standard inrush suppression techniques which use negative temperature coefficient (NTC) thermistors are problematic in dealing with these momentary power interruptions. The NTC, which is initially open and in a state of high resistance, gradually closes as current through the NTC causes heating and a decrease in resistance. Then, after an inrush protection circuit utilizing an NTC has been utilized, the circuit typically must be maintained in an inoperative state for at least approximately one second to cool down before the inrush protection circuit can be utilized again. Consequently, the inrush protection circuit utilizing an NTC cannot provide inrush protection with momentary power interruptions which are spaced closer together than this cool down time.

In addition, the inrush protection circuit utilizing the NTC is typically continuously in the current path of the electrical components onboard the aircraft. Therefore, the inrush protection circuit must be designed to be rated for the entire current load of the electrical components which receive power through the inrush protection circuit, even after the circuit no longer provides the inrush current protection function. Therefore, the inrush current protection circuit utilizing the NTC adds additional heat dissipation, size, and weight to the aircraft electrical system.

SUMMARY

An inrush current protection circuit for a polyphase alternating current power system includes a plurality of current limiting resistors. Each of the plurality of current limiting resistors may be electrically coupled in series between a respective one of a plurality of phases of a polyphase alternating current power source and a respective input of a polyphase transformer rectifier unit. The circuit may also include a plurality of first power switches. Each of the plurality of first power switches may be electrically coupled in parallel with a respective one of the plurality of current limiting resistors, such that when each of the plurality of first power switches is closed, essentially no electrical current flows through the respective one of the plurality of current limiting resistors, and when each of the plurality of first power switches is open, electrical current flows through the respective one of the plurality of current limiting resistors. The circuit may also include a power switch controller configured to control each of the plurality of first power switches to be open such that an inrush current passes through the respective one of the plurality of current limiting resistors rather than the power switch, and to be closed after a time delay has passed.

A method of limiting inrush current from a polyphase alternating current power source includes applying a voltage from a polyphase alternating current power source across a plurality of current limiting resistors. Each of the plurality of current limiting resistors may be electrically coupled in series between a respective one of a plurality of phases of the polyphase alternating current power source and a respective input of a polyphase transformer rectifier unit. The method may also include monitoring at least one of the plurality of phases of the polyphase alternating current power source to determine an operating condition of the polyphase alternating current power source. The method may also include maintaining a plurality of first power switches in an open state. Each of the plurality of first power switches may be electrically coupled in parallel with a respective one of the plurality of current limiting resistors, when the operating condition of the polyphase alternating current power source is not determined to be in a steady state operating condition, such that electrical current flows through the respective one of the plurality of current limiting resistors. The method may further include closing each of the plurality of first power switches after a time delay has elapsed since the operating condition of the polyphase alternating current power source is determined to be in a steady state operating condition, such that essentially no electrical current flows through the respective one of the plurality of current limiting resistors after a peak of the inrush current has passed.

An inrush current protection circuit for a wild frequency polyphase alternating current power system may include a plurality of current limiting resistors. Each of the plurality of current limiting resistors may be electrically coupled in series between a respective one of a plurality of phases of a wild frequency polyphase alternating current power source and a respective input of a wild frequency polyphase transformer rectifier unit. The circuit may also include a plurality of first power switches. Each of the plurality of first power switches may be electrically coupled in parallel with a respective one of the plurality of current limiting resistors, such that when each of the plurality of first power switches is closed, essentially no electrical current flows through the respective one of the plurality of current limiting resistors, and when each of the plurality of first power switches is open, wild frequency alternating electrical current flows through the respective one of the plurality of current limiting resistors. The circuit may additionally include a polyphase power input monitor operatively coupled with at least one of the plurality of phases of the polyphase alternating current power source to monitor and output information relating thereto. The circuit may further include a power switch controller communicatively coupled with the polyphase power input monitor and operatively coupled with each of the plurality of first power switches such that in response to the information output by the polyphase power input monitor, each of the plurality of first power switches is controlled to be open such that an inrush current passes through the respective one of the plurality of current limiting resistors rather than the power switch, and controlled to be closed after a peak of the inrush current has passed.

DETAILED DESCRIPTION

Wild frequency alternating current power on an aircraft presents challenges to electrical equipment drawing power therefrom. For example, brushless direct current (BLDC) fan and compressor motors are commonly used in refrigeration system equipment which is powered by wild frequency alternating current power sources. These BLDC motors are typically driven using motor controllers which operate from power provided by a common DC bus with a large bus capacitance configured to sustain dynamic current requirements of the BLDC motors. BLDC motors are typically used because alternating current (AC) induction motors are not compatible with the varying frequency of a wild frequency alternating current power system. The AC induction motors are typically designed for and operate at a fixed frequency, such as 50 or 60 Hertz (Hz). For BLDC motors to be used, the wild frequency alternating current power must be rectified to a DC bus voltage, which typically causes distortion of the AC current harmonics. The distortion of the AC current harmonics is typically unacceptable for aircraft power quality requirements. An AC transformer is typically used to correct the distortion by essentially eliminating the current harmonics. In a polyphase AC power system, a polyphase AC transformer may be used. However, the polyphase AC transformer and DC bus capacitance both may cause excessive inrush current, which presents another unacceptable power quality problem.

Electrical equipment incorporating motor controllers which present an electrical load (e.g., draw power from) an AC power source onboard an aircraft typically must meet stringent maximum inrush current power quality requirements. Inrush current may be required to be limited to a maximum of 150% of the current drawn by the electrical equipment operating with normal alternating current voltage amplitude over a frequency range of 360 Hz to 800 Hz at full steady state load during the first 10 microseconds (es), 125% thereafter until 1.5 seconds (s), and then 110% thereafter. The inrush current limitations include inrush current due to both initial equipment power on and restart power on due to a voltage transient, such as a 50 millisecond (ms) voltage transient.

Figure 1:
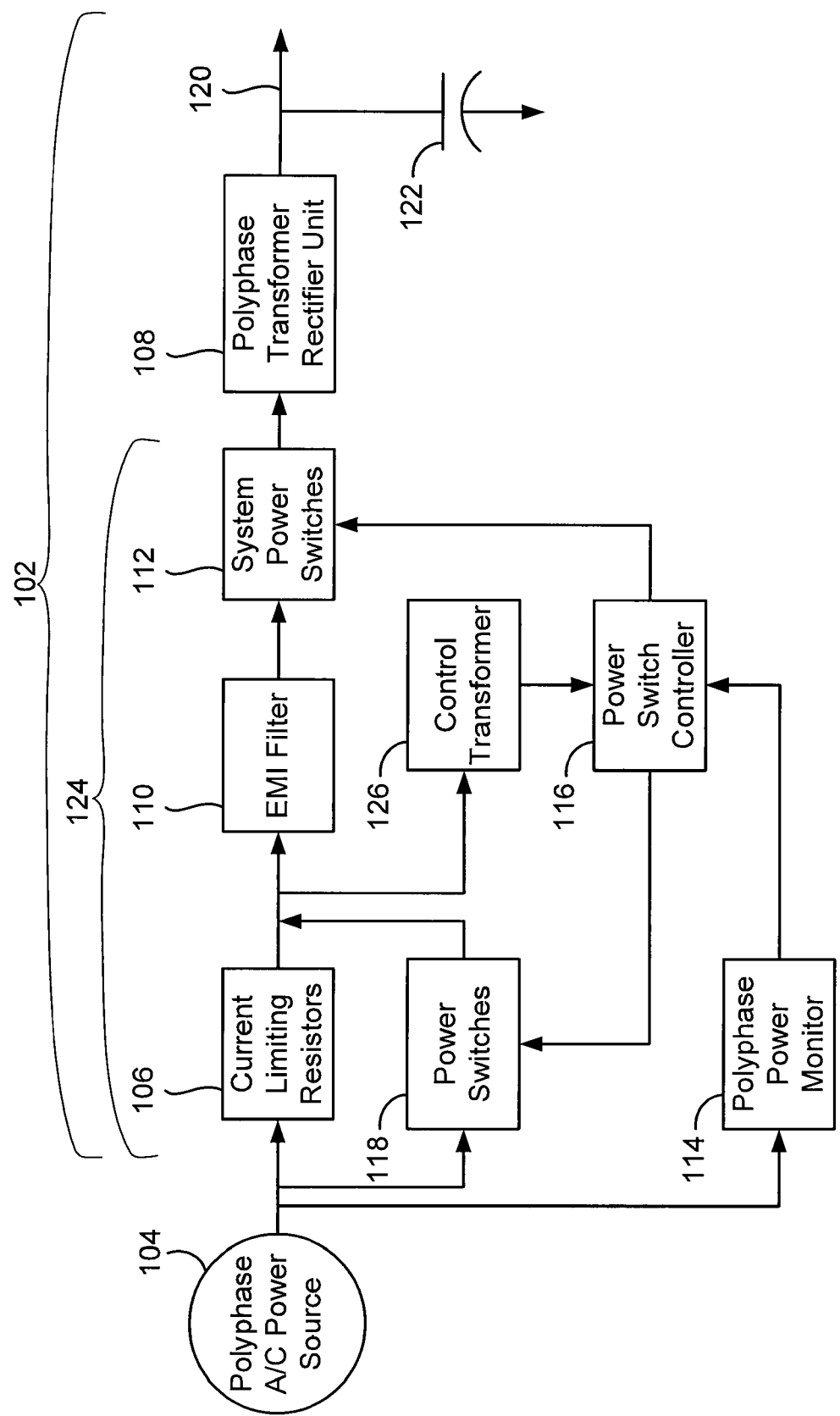
FIG. 1 illustrates an exemplary electrical power interface including a polyphase alternating current transformer inrush current limiting circuit.

FIG. 1 illustrates an exemplary electrical power interface 102 including a polyphase alternating current transformer inrush current limiting circuit 124. The polyphase alternating current transformer inrush current limiting circuit 124 and/or the electrical power interface 102 may be included in an avionic refrigeration system to meet avionic system power quality requirements for wild frequency alternating current power systems.

The electrical power interface 102 may be coupled with a polyphase alternating current power source 104. The polyphase alternating current power source 104 may include a wild frequency polyphase alternating current power source. For example, the frequency may vary unpredictably, such as between approximately 360 Hz to 800 Hz. The variation in the frequency may be due to variations in engine speed driving an electric generator attached to the engine and providing power as part of the polyphase alternating current power source 104.

The polyphase alternating current transformer inrush current limiting circuit 124 may be coupled between the polyphase alternating current power source 104 and a polyphase transformer rectifier unit 108. The polyphase transformer rectifier unit 108 may contribute to an inrush current in the electrical power interface 102. An output of the polyphase transformer rectifier unit 108 may be electrically coupled with a DC bus 120 comprising a capacitance 122, which may also contribute to the inrush current. The polyphase transformer rectifier unit 108 may convert wild frequency polyphase alternating current electric power from the polyphase alternating current power source 104 into essentially constant voltage DC electric power provided via the DC bus 120.

A plurality of current limiting resistors 106 may each be electrically coupled in series between a respective one of a plurality of phases of the polyphase alternating current power source 104 and a respective input of a polyphase transformer rectifier unit 108. The plurality of current limiting resistors 106 may be configured to suppress inrush current from the polyphase alternating current power source 104 into the polyphase alternating current electrical power interface 102 at a moment of power on of the polyphase alternating current electrical power interface 102 and/or the polyphase alternating current power source 104. The plurality of current limiting resistors 106 may also be configured to suppress inrush current at a momentary power interruption of the polyphase alternating current power source 104.

A plurality of current limiting power switches 118 may each be electrically coupled in parallel with a respective one of the plurality of current limiting resistors 106, such that when each of the plurality of current limiting power switches 118 is closed, essentially no electrical current may flow through the respective one of the plurality of current limiting resistors 106. As used herein, "essentially no electrical current" may be considered to represent that for practical purposes, and within industry-standard deviations from nominal specifications, no electrical current may flow. In some embodiments, electronic device leakage current, electrical noise, or other functionally negligible electrical current may be present even when "essentially no electrical current" flows. When "essentially no electrical current" flows through the current limiting resistors 106, any negligible amount of electrical current which may still flow through the current limiting resistors 106 may be much less than an amount of electrical current which flows through the closed current limiting power switches 118, and consequently be insignificant for practical purposes.

Alternatively, when each of the plurality of current limiting power switches 118 is open, electrical current may flow through the respective one of the plurality of current limiting resistors 106 and essentially no electrical current may flow through the current limiting power switches 118. When electrical current flows through the current limiting resistors 106, inrush current may be suppressed. The plurality of current limiting power switches 118 may include a MOSFET device, a relay switch, An electromagnetic interference (EMI) filter 110 may also be electrically coupled in series between each of the plurality of current limiting resistors 106 and the respective input of the polyphase transformer rectifier unit 108. The EMI filter 110 may reduce electromagnetic interference and improve the power quality in the electrical power interface 102. The EMI filter 110 may include any number of electrical signal filters as known in the art for suppression of electromagnetic interference.

A plurality of system power switches 112 may each be electrically coupled in series between a respective one of the plurality of current limiting resistors 106 or EMI filter 110 and a respective input of the polyphase transformer rectifier unit 108. The plurality of system power switches 112 may include a MOSFET device, a relay switch, and/or a mechanical electrical switch. When the system power switches 112 are open, no current may flow into the polyphase transformer rectifier unit 108, and consequently no power may be provided via the DC bus 120. No inrush current may be caused by the polyphase transformer rectifier unit 108 or DC bus capacitance 122 when the system power switches 112 are open. In addition, the polyphase transformer rectifier unit 108 and any electrical components drawing power from the DC bus 120 may be protected from power fluctuations in the polyphase AC power source 104 when the system power switches 112 are open. When the system power switches 112 are closed, the polyphase alternating current transformer inrush current limiting circuit 124 may be electrically coupled with the polyphase transformer rectifier unit 108.

A polyphase power input monitor 114 may be configured to monitor at least one of the plurality of phases of the polyphase alternating current power source 104 and transmit information relating thereto to the power switch controller 116. For example, the polyphase alternating current power source 104 may be monitored at any of the current limiting resistors 106. The power switch controller 116 may be configured to control the current limiting power switches 118 in response to at least the information received from the polyphase power input monitor 114. For example, when a power interruption is sensed by the polyphase power input monitor 114, the power switch controller 116 may control each of the plurality of current limiting power switches 118 to open, thereby effectively inserting the current limiting resistors 106 into the current load path to suppress any inrush current which may be due to the power interruption. The detection of the power interruption and opening of the current limiting power switches 118 may occur significantly faster than a length of time of the power interruption, effectively providing inrush current protection for each power interruption which may occur.

The power switch controller 116 may be configured to control each of the plurality of current limiting power switches 118 to be open such that an inrush current passes through the respective one of the plurality of current limiting resistors 116 rather than the current limiting power switch 118, and to be closed after a peak of the inrush current has passed. For example, the power switch controller 116 may be configured to control each of the plurality of current limiting power switches 118 to close after a preconfigured time has elapsed since a moment of power on or since a power on voltage is sensed by the polyphase power input monitor 114. The preconfigured time after which the power switch controller 116 controls each of the plurality of current limiting power switches 118 to close may be approximately one second.

The power switch controller 116 may be further configured to control each of the plurality of system power switches 112 to be open such that a power-on transient of the polyphase alternating current power source 104 does not reach the polyphase transformer rectifier unit 108, and to be closed after a preconfigured time has elapsed since a power on voltage is sensed by the polyphase power input monitor 114, for example at the moment of power on. The preconfigured time after which the power switch controller 116 closes the system power switches 112 may be approximately 250 ms. The system power switches 112 and the current limiting power switches 118 may be normally in an open state unless actively closed by the power switch controller 116.

The power switch controller 116 may be further configured to control the current limiting power switches 118 in response to at least the information received from the polyphase power input monitor 114 regarding the wild frequency characteristics of the polyphase alternating current power source 104. The power switch controller 116 may also use a preconfigured time delay between first power on to determine when to close the current limiting power switches 118. For example, the preconfigured time delay may be approximately one second.

The power switch controller 116 may include a processor configured to execute computer-executable instructions stored on a computer readable storage medium. The power switch controller 116 may also include electronic circuitry having logic configured to perform the methods described herein to control the electrical power interface 102. Examples of computer readable storage media include integrated circuits (e.g., read only memory (ROM), random access memory (ROM), static RAM, dynamic RAM, and flash memory), magnetic media (e.g., floppy disks, hard disks), optical media (CD-ROM's, DVD's), and other computer readable storage media as known in the art. Logic may be implemented using discrete electronic components, integrated circuits, application specific integrated circuits (ASIC's), field programmable gate arrays (FPGA's), and/or other electronic technologies as known in the art.

A control transformer 126 may be electrically coupled between one or more of the plurality of current limiting resistors 106 and the power switch controller 116. The control transformer 126 may be configured to transform AC power from the polyphase alternating current power source 104 into a DC power output for powering the power switch controller 116. The control transformer 126 may contribute to the inrush current of the electrical power interface 102 in a manner similar to that of the polyphase transformer rectifier unit 108. The contribution of the control transformer 126 to the inrush current may be much smaller than that of the polyphase transformer rectifier unit 108 because the amount of current required to be supplied by the control transformer 126 may be much smaller than that of the polyphase transformer rectifier unit 108. For example, the control transformer 126 may only be required to provide power to the circuitry of the power switch controller 116, which may operate on low power levels.

The exemplary polyphase alternating current transformer inrush current limiting circuit of FIG. 1 may limit inrush current when equipment, such as avionic refrigeration systems, first power on by maintaining the current limiting power switches 118 in an open position when insufficient power is present at the polyphase alternating current power source 104 and/or when the electrical power interface 102 is not active. When the current limiting power switches 118 are open, the current limiting resistors 106 may each be in series with essentially the entire current load of the respective phase of the polyphase alternating current power. The current load may include the polyphase transformer rectifier unit 108 as well as the DC bus capacitance 122 coupled with the DC bus 120, both of which may contribute to the inrush current which the current limiting resistors 106 may be configured to suppress. The current load may also include any electronic components drawing power from the DC bus 120.

The polyphase transformer rectifier unit 108 may present the largest source of inrush current in the electrical power interface 102. This may be due to magnetizing current present in the polyphase transformer rectifier unit 108. The inrush current presented by the DC bus capacitance 122 may be due to charging of the capacitance to steady state value. After inrush current has subsided, or essentially ceased being a significant detriment to operation of the electrical power interface 102 or any components drawing power from the DC bus 120, the power switch controller 116 may control the current limiting power switches 118 to close, effectively removing the current limiting resistors 106 from the electrical circuit (e.g., current load path) between the polyphase alternating current power source 104 and the polyphase transformer rectifier unit 108. Because the current limiting resistors 106 may only be present in the current load path during the presence of the inrush current, the current limiting resistors 106 and associated components need only be rated for the inrush current and do not need to be rated for the full operational current, or total power load, of the polyphase transformer rectifier unit 108 and the electrical equipment drawing power therefrom via the DC bus 120.

Figure 2:
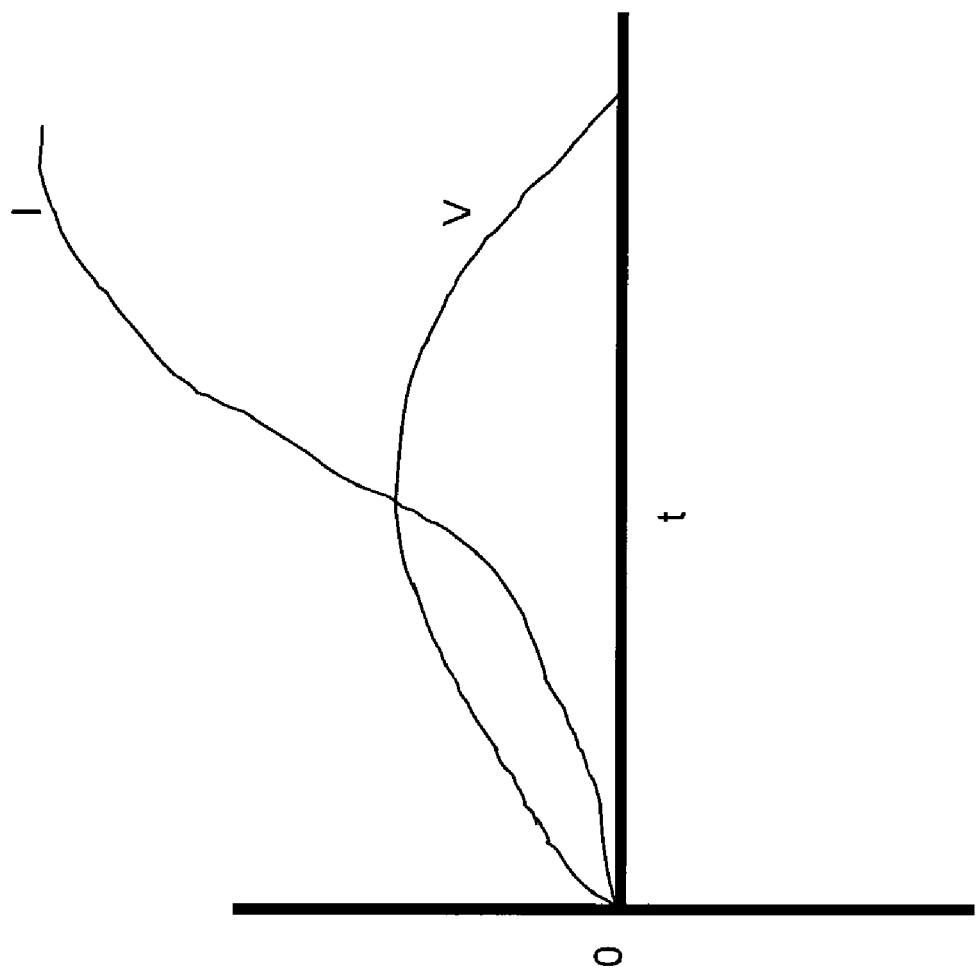
FIG. 2 illustrates an exemplary polyphase transformer current inrush characteristic.

FIG. 2 illustrates an exemplary polyphase transformer current inrush characteristic. The exemplary polyphase transformer current inrush characteristic illustrated in FIG. 2 may be characteristic of the polyphase transformer rectifier unit 108, described with reference to FIG. 1. As illustrated in FIG. 2, as a time t progresses from a moment of power on at which both a voltage V and a current I at an input to the electrical power interface 102 are at a value of 0, the voltage V may exhibit a waveform cycling above and below the value of 0 with the frequency of an alternating current power source, such as the polyphase alternating current power source 104. The current I may exhibit a current inrush caused by heavy magnetizing current of a core of the transformer. An amplitude of the current I may depend upon a point in time t at which the alternating current voltage waveform is applied to the transformer at the moment of power on. Inrush current may be at a maximum when the alternating current voltage waveform of the alternating current power source is at the zero crossing at the moment of power on. At this point, a magnetizing current in the transformer core may saturate and may be at a significantly higher amplitude than a current in the transformer core during steady-state operation. The saturation magnetizing current amplitude may be at its maximum during the first half cycle of the alternating current voltage waveform, and then begin to subside as the magnetization of the transformer core stabilizes, as illustrated by FIG. 2.

Figure 3:
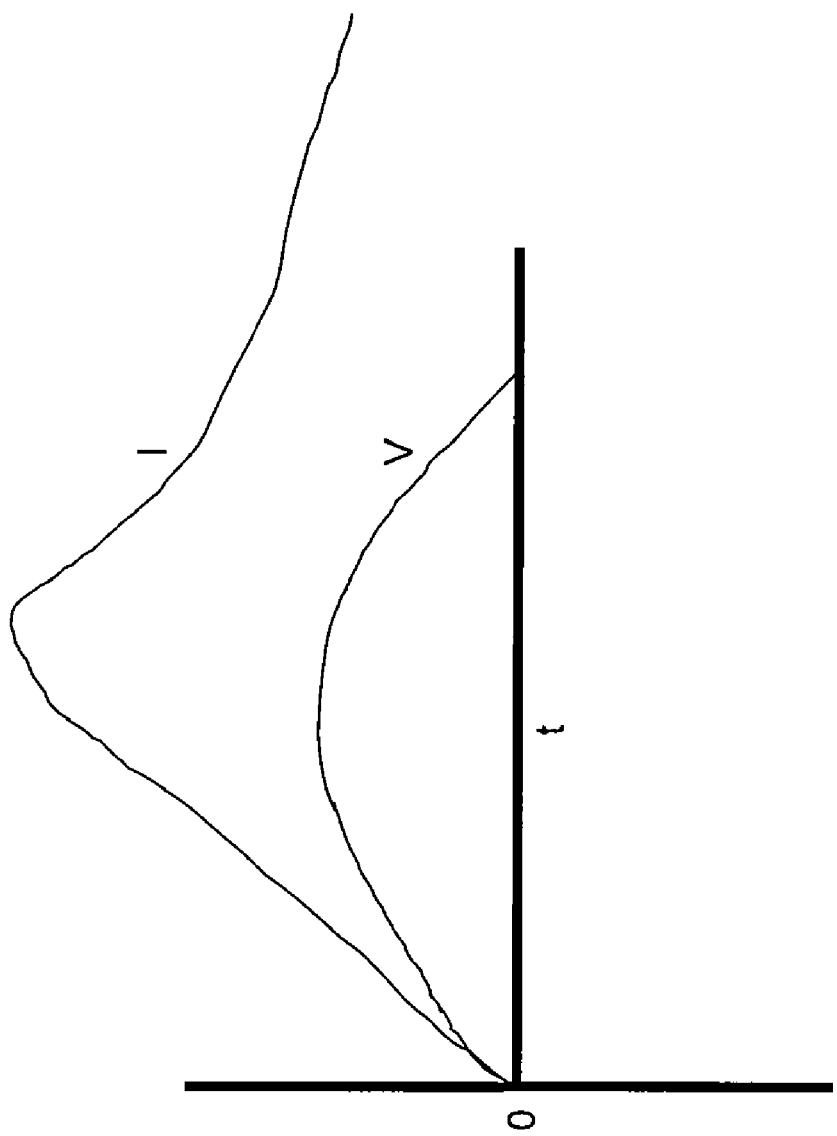
FIG. 3 illustrates an exemplary DC bus capacitance current inrush characteristic.

FIG. 3 illustrates an exemplary DC bus capacitance current inrush characteristic. The exemplary DC bus capacitance current inrush characteristic may be characteristic of the DC bus capacitance 122, described with reference to FIG. 1. The inrush current I due to the DC bus capacitance charging may reach a peak value at approximately a time t when the alternating current voltage waveform V at the DC bus capacitance reaches a peak value. The inrush current I may take several cycles of the voltage waveform V to ramp down as the DC bus capacitance 122 charges to a steady state value. There may be an exponential decay time associated with the ramping down of the inrush current I due to the DC bus capacitance 122. The exponential decay time may be dependent upon a capacitance value of the DC bus capacitance 122.

Figure 4:
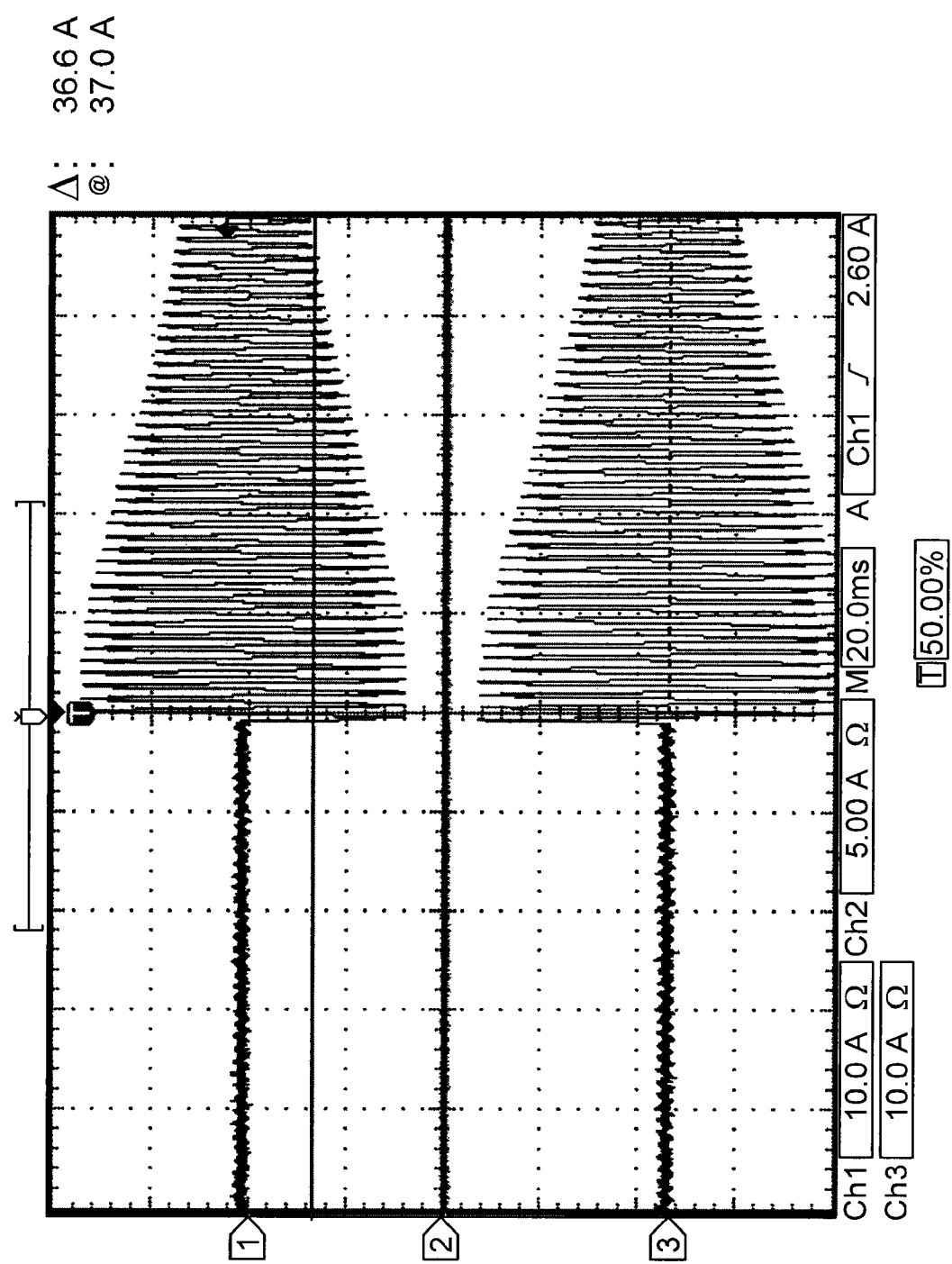
FIG. 4 illustrates exemplary DC bus capacitance current inrush waveforms without using an embodiment of the inrush protection circuit.

FIG. 4 illustrates exemplary DC bus capacitance current inrush waveforms without using an embodiment of the inrush protection circuit. Illustrated are three phases (1, 2, and 3) of a polyphase electrical power interface. A horizontal scale of FIG. 4 is 20 ms per square while a vertical scale is 10 Amps per square. As illustrated, the current inrush may begin after a moment of power when an alternating current waveform is provided to the electrical power interface 102. The inrush current may reach a peak during the first cycle of the alternating current waveform, and then decay as described with reference to FIG. 3. The DC bus capacitance current inrush may occur between any two or more of the phases of the polyphase alternating current power source 104. Which phases are affected by the DC bus capacitance current inrush may vary in a nondeterministic fashion such that a different set of phases is affected each time a DC bus capacitance current inrush occurs. As illustrated in FIG. 4, the DC bus capacitance current inrush occurs between phase 1 and phase 3. Without the embodiments of the inrush current limiting circuitry described herein, the inrush current waveform may violate power quality requirements for applications employing the polyphase alternating current electrical power interface 102. While a power quality requirement may limit acceptable inrush current to 125% of the steady state current in all phases, the illustrated inrush current in FIG. 4 may be an order of magnitude or more larger than the steady state current.

Figure 5:
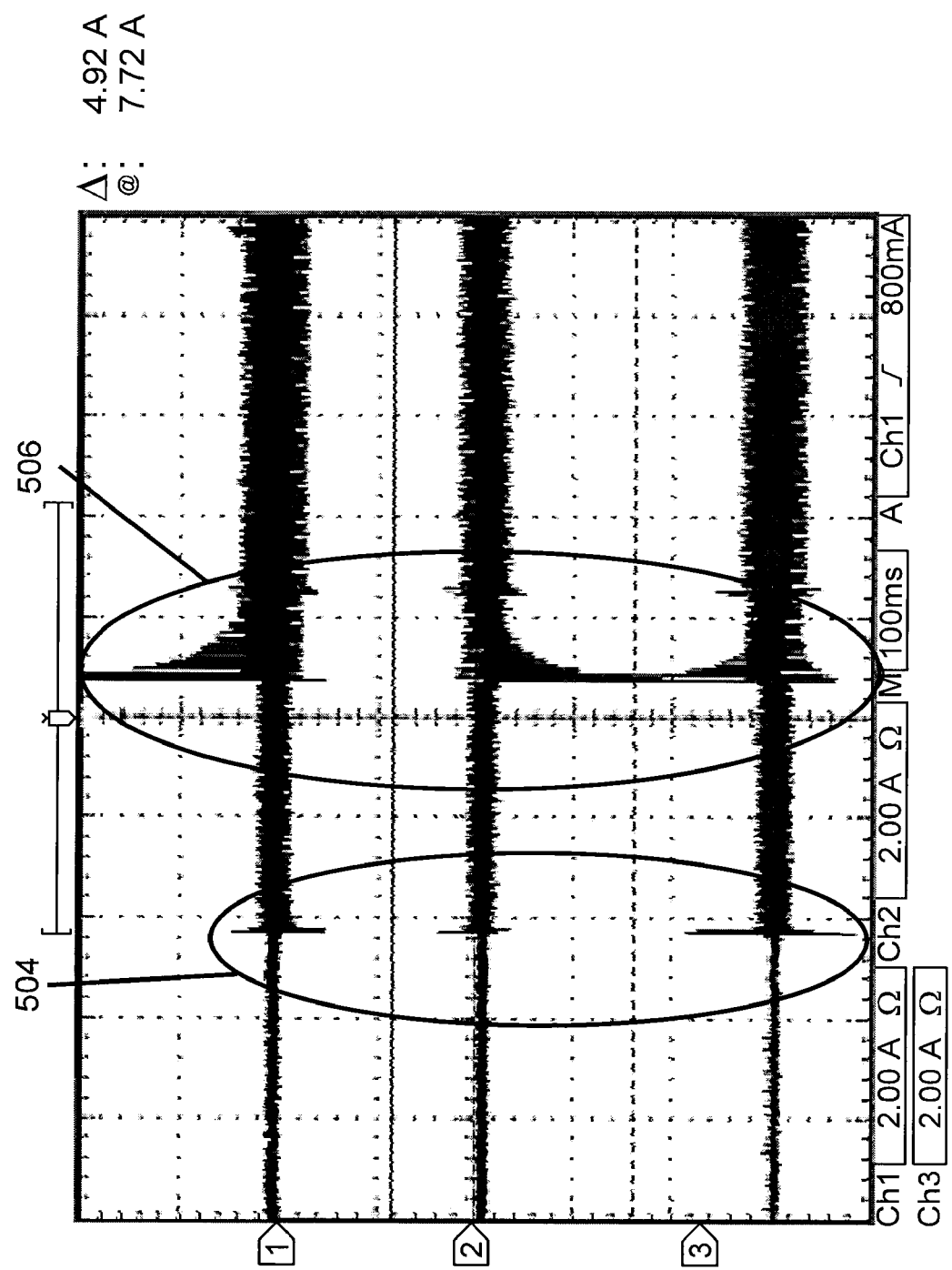
FIG. 5 illustrates exemplary polyphase and control transformer current inrush waveforms without using an embodiment of the inrush protection circuit.

FIG. 5 illustrates exemplary polyphase and control transformer current inrush waveforms without using an embodiment of the inrush protection circuit. Illustrated are three phases (1, 2, and 3) of a polyphase electrical power interface. A horizontal scale of FIG. 5 is 100 ms per square while a vertical scale is 2 Amps per square. As illustrated, the current inrush may begin after a moment of power on when an alternating current waveform is provided to the electrical power interface 102. Because initially the system power switches 112 are open, the inrush current 504 due to the control transformer appears first, while the inrush current 506 due to the polyphase transformer rectifier unit 108 appears at a later time after the system power switches 112 are closed. The total inrush current may reach a peak during the first cycle of the alternating current waveform, and then decay as described with reference to FIG. 2. Without the embodiments of the inrush current limiting circuitry described herein, the inrush current waveform may violate power quality requirements for applications employing the electrical power interface 102. While a power quality requirement may limit acceptable inrush current to 125% of the steady state current, the illustrated inrush current in FIG. 5 may be significantly larger than the steady state current.

Figure 6:
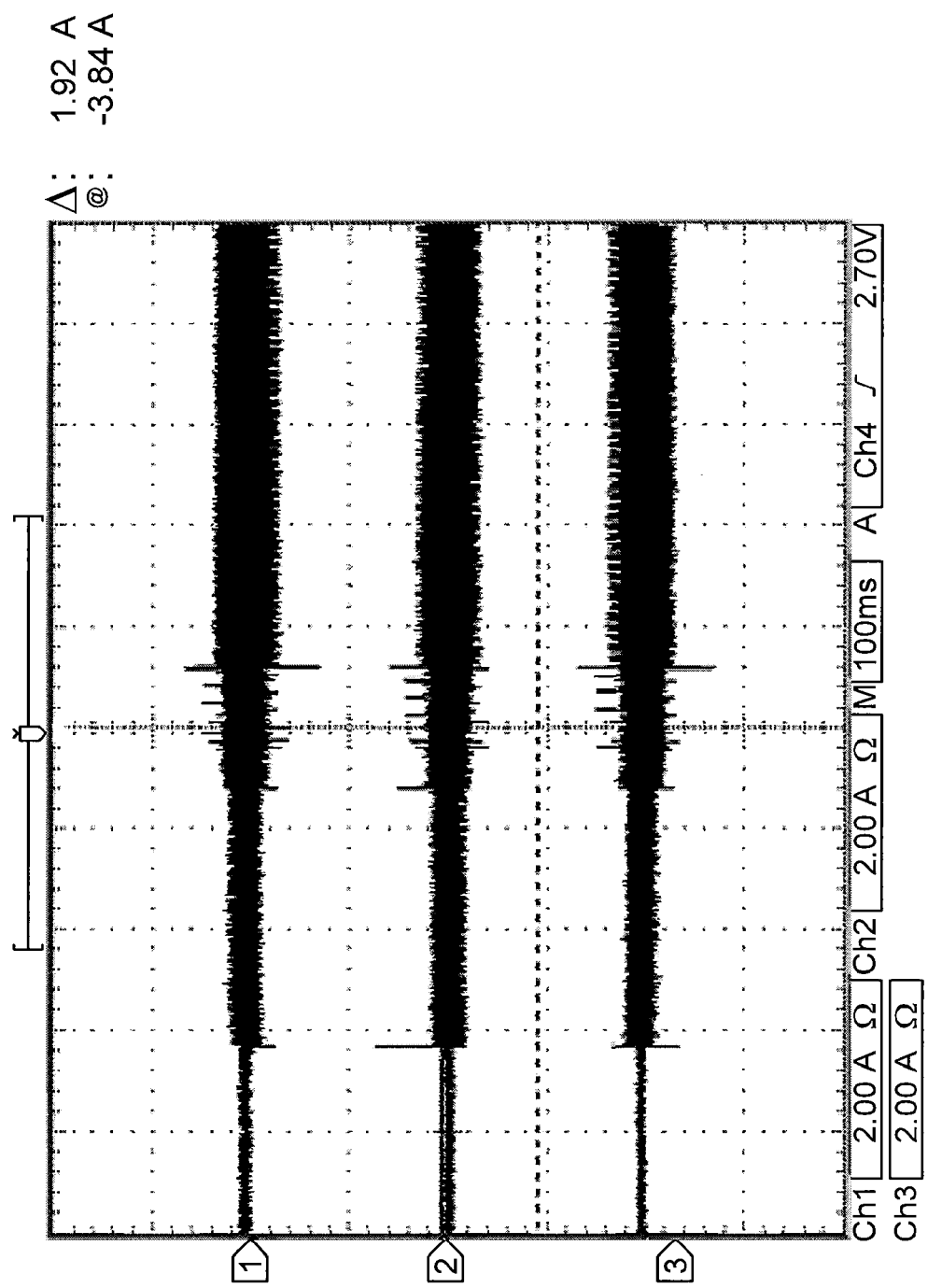
FIG. 6 illustrates exemplary aggregate current inrush waveforms using an embodiment of the inrush protection circuit.

FIG. 6 illustrates exemplary aggregate current inrush waveforms using an embodiment of the inrush protection circuit. Illustrated are three phases (1, 2, and 3) of a polyphase electrical power interface. A horizontal scale of FIG. 6 is 100 ms per square while a vertical scale is 2 Amps per square. The current inrush waveform illustrated aggregates the inrush current due to the control transformer 126, the polyphase transformer rectifier unit 108, and the DC bus capacitance 122. As illustrated, the current inrush may begin after a moment of power on when an alternating current waveform is provided to the electrical power interface 102. The inrush current may be suppressed by an embodiment of the polyphase alternating current transformer inrush current limiting circuit 124 as described herein such that power quality requirements are met. For example, the power quality requirements limiting inrush current to less than 150%, 125%, and 110% of the steady state current may be met.

Figure 7:
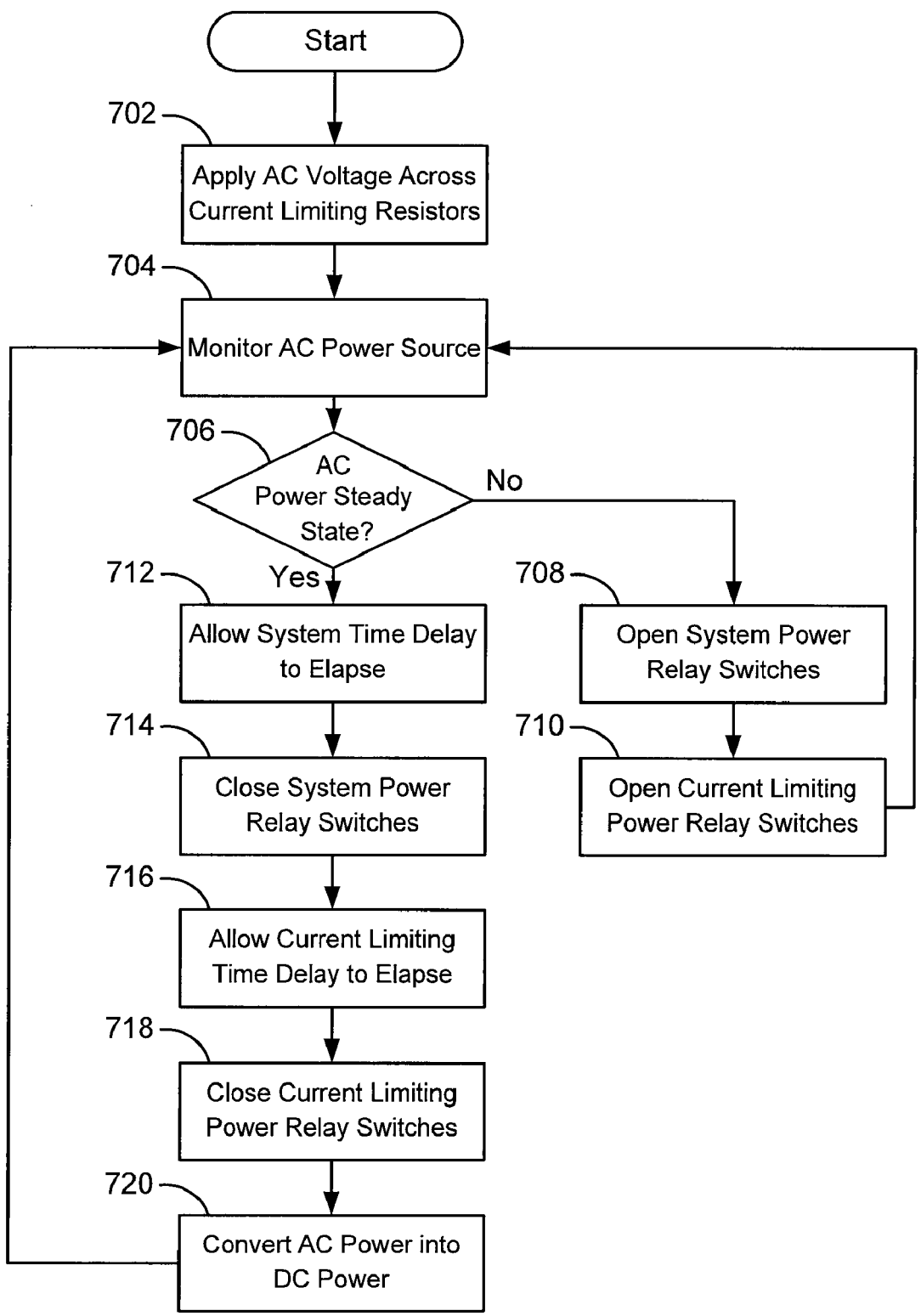
FIG. 7 illustrates a method of limiting inrush current from a polyphase alternating current power source.

FIG. 7 illustrates a method of limiting inrush current from a polyphase alternating current power source. The method of FIG. 7 may be practiced using the electrical power interface 102 described with reference to FIG. 1. The polyphase alternating current power source may include the polyphase alternating current power source 104. The polyphase alternating current power source may include a wild frequency polyphase alternating current power source. The steps illustrated and their order are exemplary. Steps included in the method may be applied in different orders, and some steps may not be applied in some embodiments. The method may be continuously applied as long as power is provided by the polyphase alternating current power source 104.

In a step 702, a voltage from the polyphase alternating current power source 104 may be applied across a plurality of current limiting resistors 106. Each of the plurality of current limiting resistors may be electrically coupled in series between a respective one of a plurality of phases of the polyphase alternating current power source 104 and a respective input of a polyphase transformer rectifier unit 108. Electrical current including the inrush current of the electrical power interface 102 may flow through the plurality of current limiting resistors 106. The electrical current flowing through the plurality of current limiting resistors 106 may include wild frequency alternating current.

In an exemplary embodiment, there may be three phases of the polyphase alternating current power source, three current limiting resistors 106, and three inputs to the polyphase transformer rectifier unit, one input for each of the respective phases. Additional electrical components may be included in an electrical current load path between each of the current limiting resistors 106 and the polyphase alternating current power source, or between each of the current limiting resistors 106 and the polyphase transformer rectifier unit 108. Consequently, a portion of the full voltage provided by the polyphase alternating current power source 104 may be applied across the additional electrical components while another portion of the full voltage provided by the polyphase alternating current power source 104 may be applied across the current limiting resistor 106 in a current load path corresponding to a phase of the polyphase alternating current power source 104.

In a step 704, an operating condition of at least one of the plurality of phases of the polyphase alternating current power source 104 may be monitored. A voltage, a current, and/or a frequency of the polyphase alternating current power source 104 may be monitored. The monitoring may be performed in real-time by the polyphase power monitor 114. Information including the monitored values may be provided to the power switch controller 116.

In a step 706, a determination may be made as to whether an operating condition of the polyphase alternating current power source 104 is a steady-state operating condition. The operating condition may be determined to be in a steady state if a voltage of a phase of the polyphase alternating current power source 104 is within an operating range, for example between approximately 110 and 120 volts (V), and/or if a frequency of the phase is within an operating range, for example between approximately 360 and 800 Hz. The determination may be made based at least partially on monitored voltage values and/or frequency values. A current drawn by the electrical power interface 102 may also be used to determine whether the polyphase alternating current power source 104 in conjunction with the electrical power interface 102 is within an operating range. The determination may be made based at least partially on how the voltage values, the frequency values, and/or the current drawn change over a monitored period of time, such as over a few ms. The determination may be made by the power switch controller 116.

In a step 708, when the operating condition of the polyphase alternating current power source 104 is determined to not be in a steady state operating condition in step 706, the system power switches 112 may be opened or maintained in an open state. Each of the system power switches 112 may be electrically coupled in series between a respective one of the current limiting resistors 106 and a respective input of the polyphase transformer rectifier unit 108. By maintaining the system power switches 112 in an open state, essentially no electrical current may flow through into the polyphase transformer rectifier unit 108. Consequently, a power-on transient of the polyphase alternating current power source 104 may not reach the polyphase transformer rectifier unit 108 or any electrical components which may receive power from the DC bus 120 coupled therewith. In some embodiments, the system power switches 112 may not be opened (i.e., remain closed) if only a momentary power interruption is monitored in step 704.

In a step 710, when the operating condition of the polyphase alternating current power source 104 is determined to not be in a steady state operating condition in step 706, the current limiting power switches 118 may be opened or maintained in an open state. The current limiting power switches 118 may also be opened after the operating condition of the polyphase alternating current power source 104 is determined to be interrupted. Each of the current limiting power switches 118 may be electrically coupled in parallel with a respective one of the current limiting resistors 106. By maintaining the current limiting power switches 118 in an open state, electrical current may flow through the respective current limiting resistors 106, thereby limiting the inrush current to the electrical power interface 102.

In a step 712, when the operating condition of the polyphase alternating current power source 104 is determined to be in a steady state operating condition in step 706, a time delay may be caused to elapse since the operating condition of the polyphase alternating current power source 104 is determined to be in the steady state operating condition. The time delay may be a predetermined time delay, or may be at least partially dependent upon information received by the switch controller 116 from the polyphase power monitor 114. The time delay in step 712 may be set to allow any start-up power-on transients of the polyphase alternating current power source 104 to decay prior to electrically coupling the polyphase transformer rectifier unit 108 with the polyphase alternating current power source 104. The time delay in step 712 may only be caused to elapse if the system power switches 112 are in an open state.

In a step 714, after the time delay in step 712 has elapsed, each of the system power switches 112 may be closed to electrically couple the polyphase transformer rectifier unit 108 with the polyphase alternating current power source 104. After the system power switches 112 are closed, electrical current including a system load current drawn by electrical components coupled with the DC bus 120 may flow through the system power switches 112. The electrical current may also include inrush current from the polyphase transformer rectifier unit 108 and/or inrush current from the DC bus capacitance 122.

In a step 716, when the operating condition of the polyphase alternating current power source 104 is determined to be in a steady state operating condition in step 706, a time delay may be caused to elapse since the operating condition of the polyphase alternating current power source 104 is determined to be in the steady state operating condition. The time delay may be a predetermined time delay, or may be at least partially dependent upon information received by the switch controller 116 from the polyphase power monitor 114. The time delay in step 716 may be set to allow any inrush current from the polyphase transformer rectifier unit 108, the DC bus capacitance 122, and/or the control transformer 126 to decay prior to electrically removing the current limiting resistors 106 from the system load current path of the electrical power interface 102. The time delay in step 716 may only be caused to elapse if the current limiting power switches 118 are in an open state.

In a step 718, after the time delay in step 716 has elapsed, each of the current limiting power switches 118 may be closed. After each of the current limiting power switches 118 is closed, essentially no electrical current may flow through the respective current limiting resistor 106. Consequently, the current limiting resistors 106 may be effectively removed from the system load current path of the electrical power interface 102 after a peak of the inrush current has passed.

In a step 720, the polyphase transformer rectifier unit 108 may convert power from the polyphase alternating current power source 104 into DC power. The DC power may be at an essentially constant voltage and be provided via the DC power bus 120. When power is first applied to the polyphase transformer rectifier unit 108 after the system power switches 112 are closed in step 714, the polyphase transformer rectifier unit 112 may contribute to the inrush current.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. It will be recognized that the terms "comprising," "including," and "having," as used herein, are specifically intended to be read as open-ended terms of art.

What is claimed is:

1. An inrush current protection circuit for a polyphase alternating current power system, the circuit comprising:
    a plurality of current limiting resistors, each of the plurality of current limiting resistors electrically coupled in series between a respective one of a plurality of phases of a polyphase alternating current power source and a respective input of a polyphase transformer rectifier unit;
    a plurality of first power switches, each of the plurality of first power switches electrically coupled in parallel with a respective one of the plurality of current limiting resistors, such that when each of the plurality of first power switches is closed, essentially no electrical current flows through the respective one of the plurality of current limiting resistors, and when each of the plurality of first power switches is open, electrical current flows through the respective one of the plurality of current limiting resistors;
    a plurality of second power switches, each of the plurality of second power switches electrically coupled in series between a respective one of the plurality of current limiting resistors and a respective input of the polyphase transformer rectifier unit; and
    a power switch controller configured to control each of the plurality of first power switches to be open such that when the polyphase alternating current power source is applied to the inrush current protection circuit, an inrush current passes through the respective one of the plurality of current limiting resistors rather than the respective first power switch, and to be closed after a first time delay has passed, the power switch controller further configured to control each of the plurality of second power switches to be open such that when the polyphase alternating current power source is applied to the inrush current protection circuit, a power-on transient of the polyphase alternating current power source does not reach the polyphase transformer rectifier unit, and to be closed after a second time delay has elapsed, the second time delay being shorter than the first time delay such that the plurality of second power switches are closed before the plurality of first power switches are closed.

2. The inrush current protection circuit of claim 1, further comprising a polyphase power input monitor configured to monitor at least one of the plurality of phases of the polyphase alternating current power source and transmit information relating thereto to the power switch controller, and wherein the power switch controller is further configured to control each of the plurality of first power switches in response to at least the information received from the polyphase power input monitor.

3. The inrush current protection circuit of claim 2, wherein the power switch controller is further configured to control each of the plurality of first power switches to open when a power interruption is sensed by the polyphase power input monitor.

4. The inrush current protection circuit of claim 2, wherein the power switch controller is further configured to control each of the plurality of first power switches to open such that an inrush current passes through the respective one of the plurality of current limiting resistors rather than the power switch, and to close after a preconfigured time has elapsed since a power on voltage is sensed by the polyphase power input monitor.

5. The inrush current protection circuit of claim 2, wherein the polyphase power input monitor is further configured to monitor each of the plurality of phases of the polyphase alternating current power source wherein the polyphase alternating current power source is wild frequency polyphase alternating current power source, and wherein the power switch controller is further configured to control each of the plurality of first power switches in response to at least the information received from the polyphase power input monitor regarding the wild frequency polyphase alternating current power source.

6. The inrush current protection circuit of claim 1, further comprising the polyphase transformer rectifier unit, wherein the polyphase transformer rectifier unit contributes to the inrush current.

7. The inrush current protection circuit of claim 6, wherein an output of the polyphase transformer rectifier unit is electrically coupled with a DC bus comprising a capacitance which contributes to the inrush current.

8. The inrush current protection circuit of claim 6, wherein the polyphase transformer rectifier unit is configured to convert wild frequency polyphase alternating current electric power into essentially constant voltage direct current electric power.

9. The inrush current protection circuit of claim 1, further comprising an electromagnetic interference filter electrically coupled in series between each of the plurality of current limiting resistors and the respective input of the polyphase transformer rectifier unit.

10. The inrush current protection circuit of claim 1, further comprising a control transformer electrically coupled between each of the plurality of current limiting resistors and the power switch controller, the control transformer configured to transform the polyphase alternating current power source into a direct current power output for powering the power switch controller, and wherein the control transformer contributes to the inrush current.

11. The inrush current protection circuit of claim 1, wherein the plurality of first power switches comprise a MOSFET device.

12. The inrush current protection circuit of claim 1, wherein the first time delay is approximately 1 sec and the second time delay is approximately 250 ms.

13. A method of limiting inrush current from a polyphase alternating current power source, the method comprising:
   applying a voltage from a polyphase alternating current power source across a plurality of current limiting resistors, each of the plurality of current limiting resistors electrically coupled in series between a respective one of a plurality of phases of the polyphase alternating current power source and a respective input of a polyphase transformer rectifier unit;
   monitoring at least one of the plurality of phases of the polyphase alternating current power source to determine an operating condition of the polyphase alternating current power source;
   maintaining a plurality of first power switches in an open state, each of the plurality of first power switches electrically coupled in parallel with a respective one of the plurality of current limiting resistors, when the operating condition of the polyphase alternating current power source is not determined to be in a steady state operating condition, such that electrical current flows through the respective one of the plurality of current limiting resistors;
   maintaining a plurality of second power switches in an open state, each of the plurality of second power switches electrically coupled in series between a respective one of the plurality of current limiting resistors and a respective input of the polyphase transformer rectifier unit, when the operating condition of the polyphase alternating current power source is not determined to be in a steady state operating condition, such that essentially no electrical current flows through into the polyphase transformer rectifier unit and a power-on transient of the polyphase alternating current power source does not reach the polyphase transformer rectifier unit;
   closing each of the plurality of second power switches after a second time delay has elapsed since the operating condition of the polyphase alternating current power source is determined to be in a steady state operating condition; and
   closing each of the plurality of first power switches after a first time delay has elapsed since the operating condition of the polyphase alternating current power source is determined to be in a steady state operating condition, such that essentially no electrical current flows through the respective one of the plurality of current limiting resistors after a peak of the inrush current has passed, the second time delay being shorter than the first time delay such that the plurality of second power switches are closed before the plurality of first power switches are closed.

14. The method of claim 13, further comprising opening each of the plurality of first power switches after the operating condition of the polyphase alternating current power source is determined to be interrupted such that electrical current flows through the respective one of the plurality of current limiting resistors.

15. The method of claim 13, wherein the polyphase alternating current power source comprises a wild frequency polyphase alternating current power source.

16. The method of claim 13, wherein the electrical current that flows through the plurality of current limiting resistors comprises wild frequency alternating current.

17. The method of claim 13, further comprising converting power from the polyphase alternating current power source into direct current power using the polyphase transformer rectifier.

18. The method of claim 17, wherein the polyphase transformer rectifier contributes to the inrush current.

19. The method of claim 13, wherein the first time delay is approximately 1 sec and the second time delay is approximately 250 ms.

20. An inrush current protection circuit for a wild frequency polyphase alternating current power system, the circuit comprising:
   a plurality of current limiting resistors, each of the plurality of current limiting resistors electrically coupled in series between a respective one of a plurality of phases of a wild frequency polyphase alternating current power source and a respective input of a wild frequency polyphase transformer rectifier unit;
   a plurality of first power switches, each of the plurality of first power switches electrically coupled in parallel with a respective one of the plurality of current limiting resistors, such that when each of the plurality of first power switches is closed, essentially no electrical current flows through the respective one of the plurality of current limiting resistors, and when each of the plurality of first power switches is open, wild frequency alternating electrical current flows through the respective one of the plurality of current limiting resistors;
   a plurality of second power switches, each of the plurality of second power switches electrically coupled in series between a respective one of the plurality of current limiting resistors and a respective input of the polyphase transformer rectifier unit;
   a polyphase power input monitor operatively coupled with at least one of the plurality of phases of the polyphase alternating current power source to monitor and output information relating thereto; and
   a power switch controller communicatively coupled with the polyphase power input monitor and operatively coupled with each of the plurality of first power switches such that in response to the information output by the polyphase power input monitor, each of the plurality of first power switches is controlled to be open such that when the polyphase alternating current power source is applied to the inrush current protection circuit, an inrush current passes through the respective one of the plurality of current limiting resistors rather than the respective first power switch, and controlled to be closed after a peak of the inrush current has passed, the power switch controller further configured to control each of the plurality of second power switches to be open such that when the polyphase alternating current power source is applied to the inrush current protection circuit, a power-on transient of the polyphase alternating current power source does not reach the polyphase transformer rectifier unit, and to be closed after a preconfigured time has elapsed or the polyphase alternating current power source is in a steady state operating condition.

21. A computer readable storage medium having stored thereon a program executable by a processor to perform a method of limiting inrush current from a polyphase alternating current power source, the method comprising:

applying a voltage from a polyphase alternating current power source across a plurality of current limiting resistors, each of the plurality of current limiting resistors electrically coupled in series between a respective one of a plurality of phases of the polyphase alternating current power source and a respective input of a polyphase transformer rectifier unit;

monitoring at least one of the plurality of phases of the polyphase alternating current power source to determine an operating condition of the polyphase alternating current power source;

maintaining a plurality of first power switches in an open state, each of the plurality of first power switches electrically coupled in parallel with a respective one of the plurality of current limiting resistors, when the operating condition of the polyphase alternating current power source is not determined to be in a steady state operating condition, such that electrical current flows through the respective one of the plurality of current limiting resistors;

maintaining a plurality of second power switches in an open state, each of the luralit of second s ower switches electricall cou s led in series between a res s ective one of the plurality of current limiting resistors and a respective input of the polyphase transformer rectifier unit, when the operating condition of the polyphase alternating current power source is not determined to be in a steady state operating condition, such that essentially no electrical current flows through into the polyphase transformer rectifier unit and a power-on transient of the polyphase alternating current power source does not reach the polyphase transformer rectifier unit;

closing each of the plurality of second power switches after a second time delay has elapsed since the operating condition of the polyphase alternating current power source is determined to be in a steady state operating condition; and closing each of the plurality of first power switches after a first time delay has elapsed since the operating condition of the polyphase alternating current power source is determined to be in a steady state operating condition, such that essentially no electrical current flows through the respective one of the plurality of current limiting resistors after a peak of the inrush current has passed, the second time delay being shorter than the first time delay such that the plurality of second power switches are closed before the plurality of first power switches are closed.

* * * * *